US009505307B2

(12) United States Patent
Champagne et al.

(10) Patent No.: US 9,505,307 B2
(45) Date of Patent: Nov. 29, 2016

(54) SOLAR-THERMAL POWERED RECREATIONAL VEHICLE

(71) Applicant: Hollywood Trucks, LLC, Baton Rouge, LA (US)

(72) Inventors: Andre Champagne, New Orleans, LA (US); Roger Timoteo, Harahan, LA (US); Sean Bernard, New Orleans, LA (US)

(73) Assignee: Hollywood Trucks, LLC, Baton Rouge, LA (US)

( * ) Notice: Subject to any disclaimer, the term of this patent is extended or adjusted under 35 U.S.C. 154(b) by 0 days.

(21) Appl. No.: 14/737,339

(22) Filed: Jun. 11, 2015

(65) Prior Publication Data

US 2015/0360568 A1 Dec. 17, 2015

Related U.S. Application Data

(60) Provisional application No. 62/139,517, filed on Mar. 27, 2015, provisional application No. 62/011,443, filed on Jun. 12, 2014.

(51) Int. Cl.
*B60L 1/02* (2006.01)
*B60L 1/00* (2006.01)
(Continued)

(52) U.S. Cl.
CPC .............. *B60L 1/02* (2013.01); *B60H 1/00364* (2013.01); *B60L 1/003* (2013.01); *B60L 1/006* (2013.01);
(Continued)

(58) Field of Classification Search
CPC ............ B60P 3/36; B60L 8/003; B60L 1/02; B60L 1/006; B60L 11/1877; Y02T 10/7083; B60H 1/3236
USPC ........................................................ 296/156
See application file for complete search history.

(56) References Cited

U.S. PATENT DOCUMENTS 4,307,575 A 12/1981 Popinski
5,534,760 A 7/1996 Jung
(Continued)

FOREIGN PATENT DOCUMENTS

AU 2014101078 A4 10/2014
CN 203550123 U 4/2014
(Continued)

OTHER PUBLICATIONS

PCT/US15/35414, Hollywood Trucks, LLC; Search Report and Written Opinion dated Sep. 11, 2015, 7 pages.
(Continued)

*Primary Examiner* — Pinel Romain
(74) *Attorney, Agent, or Firm* — Jones Walker LLP (57) ABSTRACT

A solar-thermal powered recreational vehicle featuring a solar-thermal air conditioning system integrated with a solar clean energy system to provide a recreational vehicle having improved energy efficiency. In an embodiment employing the principles of the present invention, the solar-thermal powered recreational vehicle can comprise a clean energy system for providing electrical power to the recreational vehicle, whereby the clean energy system features one or more solar photovoltaic panels, a batter bank, and a generator operatively coupled to a hybrid inverter. The solar-thermal air conditioning system is powered by the clean energy system, with the solar-thermal air conditioning system featuring a solar-thermal collector panel functioning to superheat compressed refrigerant prior to the compressed refrigerant being transmitted to the condenser. Because the compressor is the most energy-intensive component in the traditional direct expansion AC system, the use of free solar energy by the present invention to reduce the work load on the compressor significantly reduces the overall energy requirements of the recreational vehicle, thereby providing a recreational vehicle capable of operating on solar and battery power alone for significant periods of time.

11 Claims, 9 Drawing Sheets

(51) Int. Cl.
*B60H 1/00* (2006.01)
*B60P 3/36* (2006.01)
*B60L 8/00* (2006.01)
*B60L 11/18* (2006.01)

(52) U.S. Cl.
CPC ............ *B60L 8/003* (2013.01); *B60L 11/1877* (2013.01); *B60P 3/36* (2013.01); *Y02T 10/7005* (2013.01); *Y02T 10/705* (2013.01); *Y02T 10/7083* (2013.01)

(56) References Cited

U.S. PATENT DOCUMENTS

| | | | |
|---|---|---|---|
| 6,533,026 | B1 | 3/2003 | Noah |
| 8,418,477 | B2 | 4/2013 | Klein et al. |
| 8,448,458 | B2 | 5/2013 | Hammond |
| 8,463,449 | B2 | 6/2013 | Sanders |
| 8,944,143 | B2* | 2/2015 | Durfee ............... B60H 1/00514 165/41 |
| 9,145,082 | B2* | 9/2015 | Hindle ...................... B60P 3/00 |
| 2010/0031682 | A1* | 2/2010 | Gaerlan ............ B60H 1/00428 62/228.1 |
| 2010/0171482 | A1 | 7/2010 | Ye et al. |
| 2010/0212659 | A1 | 8/2010 | Carpoff |
| 2014/0285005 | A1 | 9/2014 | Casteel |

FOREIGN PATENT DOCUMENTS

| | | |
|---|---|---|
| CN | 103825449 A | 5/2014 |
| CN | 203645390 U | 6/2014 |
| EP | 2354713 A1 | 8/2011 |

OTHER PUBLICATIONS

Sedna Aire USA, Solar Cool Solar Air Conditioning System, Technical Specifications, Jun. 11, 2014, 8 pages.
Schneider Electric, Conext Automatic Generator Start, Jun. 11, 2014, 2 pages.
MK Battery, 8A8D, Specifications, Jun. 11, 2014, 1 page.
Schneider Electric, 865-1010 Conext XW—inverter/charger, Product data sheet, Sep. 6, 2014, 1 page.
Schneider Electric, Conext System Control Panel, Jun. 11, 2014, 2 pages.
Sedna Aire USA, Multi Split Series—Ductless Split System Heatpump, Mar. 2012, 6 pages.

* cited by examiner

SOLAR-THERMAL POWERED RECREATIONAL VEHICLE

CROSS-REFERENCE TO RELATED APPLICATIONS

This application claims the benefit of U.S. Provisional Application No. 62/139,517, filed Mar. 27, 2015 and U.S. Provisional Application No. 62/011,443, filed Jun. 12, 2014, both of which are hereby incorporated by reference.

BACKGROUND

Recreational vehicles (RVs) are vehicles designed as temporary living quarters for recreational, camping, travel or season use. Two main categories of RVs exist: motorized motorhomes and towable trailers, which can be towed behind a vehicle. Motorized motorhomes typically are broken into classes, with Type A motorhomes being the largest, Type B motorhomes or van campers being the smallest, and Type C motorhomes generally falling in between. Types of towable RVs include folding camping trailers, expandable trailers, truck campers, conventional travel trailers and fifth-wheel travel trailers.

RVs offer a convenient, hassle-free way to travel. RVs have been shown to allow its owners to be more physically active than on typical vacations, and traveling by RV can provide reduced exposure to illness and other health risks. However, the environmental friendliness of RVs increasingly is a concern for RV owners, potential owners, and users alike. The environmental impact of RVs extends beyond just the fuel economy of the motorhomes or the vehicles pulling towable RVs. With fully-equipped kitchens and baths, flat-screen TVs, surround-sound stereos and more, the living quarters of today's RVs consume a substantial amount of energy in their own right. The HVAC systems utilized in RVs impose a particularly large energy load. Traditional RV HVAC systems are self-contained, roof mounted units which typically operate at 115 Volts AC power. These units are renowned for being energy inefficient, thereby requiring the operation of a generator to meet the power demands of the HVAC system.

Attempts to incorporate solar electric systems into RVs have been made. However, because of the high electrical load and limited surface area on which to mount PV arrays, solar power has not been considered a viable option for meeting the RV's complete energy needs. Rather, solar power has only been considered suitable for small loads, such as lights, small TV's, computers, and other small appliances. For heavy loads such as the HVAC system, a generator is required.

SUMMARY OF THE INVENTION

The recreational vehicle of the present invention features an energy efficient solar-thermal air conditioning system which utilizes a solar collector to superheat the working fluid, thereby reducing the work load imparted on the compressor. Because the compressor is the most energy-intensive component in the traditional direct expansion AC system, the use of free solar energy to reduce the work load on the compressor significantly reduces the overall energy requirements of the HVAC system. Whereas traditional recreational vehicles typically use anywhere from 4-8 kWh under normal operating conditions, the recreational vehicle of the present invention utilizes approximately 0.7-3.0 kWh under the same conditions. This reduction in the electrical load allows the recreational vehicle to operate on solar and battery power alone for significant periods of time, thereby reducing fossil fuel consumption and the decibel level within the vehicle caused by repeated and prolonged generator cycles. The reduction of generator cycles reduces also diminishes the threat of carbon monoxide exposure to occupants of the recreational vehicle.

The invention disclosed herein is directed to a solar-thermal powered recreational vehicle featuring a solar-thermal air conditioning system integrated with a solar clean energy system to provide a recreational vehicle having improved energy efficiency. In an embodiment employing the principles of the present invention, the solar-thermal powered recreational vehicle can comprise a clean energy system for providing electrical power to the recreational vehicle. The clean energy system can feature one or more solar photovoltaic panels mounted to the top of the body or enclosure of the recreational vehicle and operatively coupled to a hybrid inverter. The clean energy system can also feature both a battery bank and a generator. In instances where excess solar energy is collected by the solar photovoltaic panels, the excess electrical power will be routed by a charge controller to the battery bank for storage. The stored energy in the battery bank can routed by the hybrid inventor to the recreational vehicle to supplement or replace the solar power if the solar energy collected by the solar photovoltaic panels is insufficient to meet the current power load of the recreational vehicle. Likewise, if the solar panels and battery bank are unable to meet the power load of the recreational vehicle, a generator switch will automatically activate and engage the generator. Power from the generator will then be routed by the hybrid inventor to the recreational vehicle to meet its power needs.

The solar-thermal powered recreational vehicle can also feature a solar-thermal air conditioning system powered by the clean energy system. The solar-thermal air conditioning system can feature a condenser unit comprising a compressor and a condenser. A solar-thermal collector panel can be operatively connected to the compressor and condenser. The solar-thermal collector panel will heat the compressed refrigerant prior to the compressed refrigerant being transmitted to the condenser. An air handling unit can be mounted to the enclosure for providing the conditioned air to the enclosure. The air handling unit can feature an evaporator coil and a fan. The evaporator coil will be operatively connected to the condenser such that the refrigerant can be routed from the condenser, to the evaporator, and back to the solar compressor.

The above summary is not intended to describe each illustrated embodiment or every possible implementation. These and other features, aspects, and advantages of the present invention will become better understood with regard to the following description, appended claims, and accompanying drawings.

BRIEF DESCRIPTION OF THE DRAWINGS

The accompanying figures, where like reference numerals refer to identical or functionally similar elements throughout the separate views, and which, together with the detailed description below, are incorporated in and form part of the specification, serve to illustrate further various embodiments and to explain various principles and advantages in accordance with the present invention.

DETAILED DESCRIPTION

A solar-thermal powered recreational vehicle featuring a solar-thermal air conditioning system integrated with a clean energy system is described herein. The description which follows, and the embodiments described therein, is provided by way of illustration of examples of particular embodiments of principles and aspects of the present invention. These examples are provided for the purposes of explanation—and not of limitation—of those principles of the invention. In the description that follows, like parts are marked throughout the specification and the drawings with the same respective reference numerals. As used herein, the term "about" or "approximately" applies to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. Relational terms such as first and second, top and bottom, right and left, and the like may be used solely to distinguish one component or feature from another component or feature without necessarily requiring or implying any actual such relationship or order between such components and features.

Figure 1:
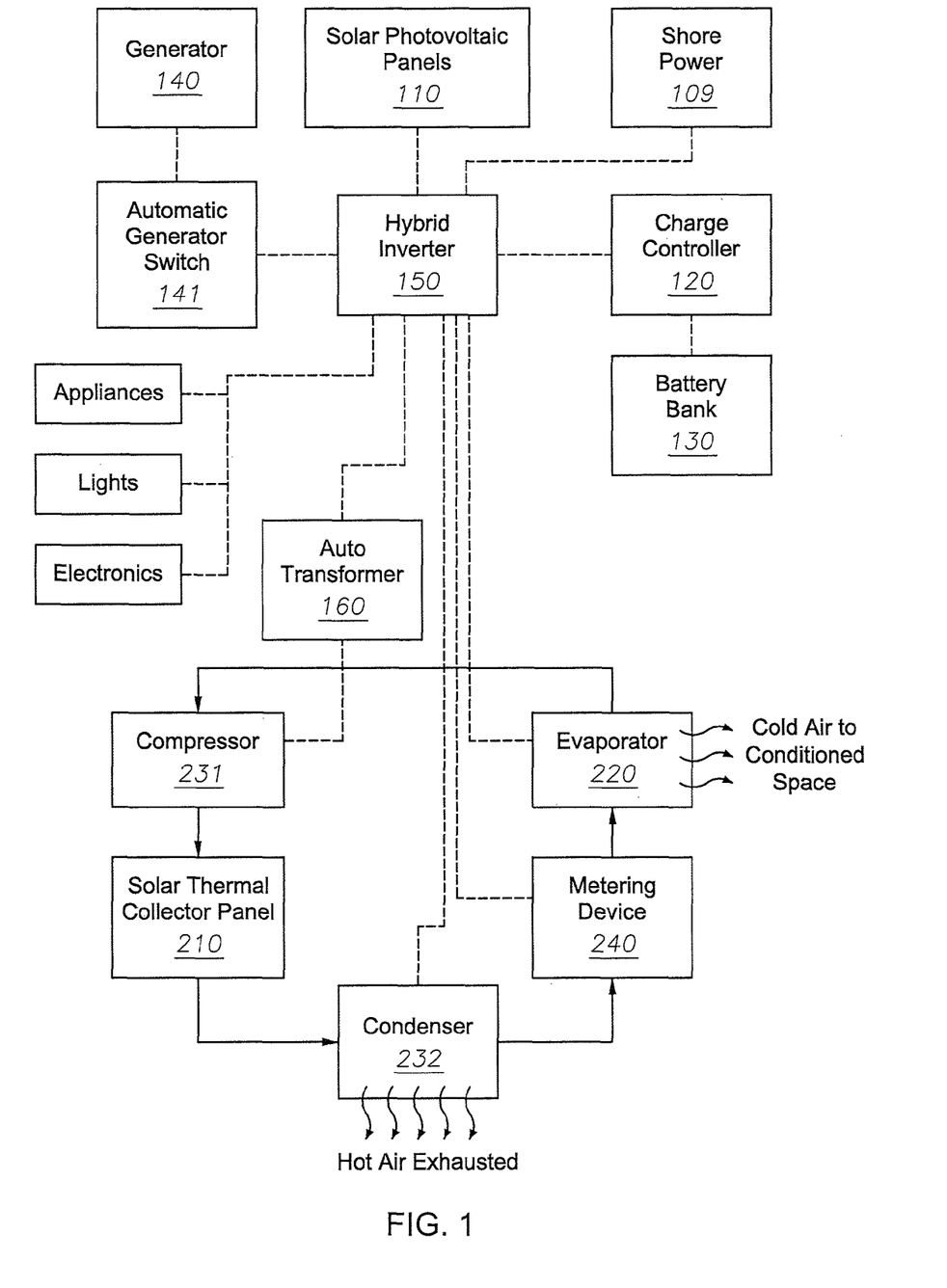
FIG. 1 is a diagram showing the interconnectivity of the solar-thermal air conditioning system and clean energy system for use in a solar-thermal powered recreational vehicle embodying principles of the present invention.
Figure 2:
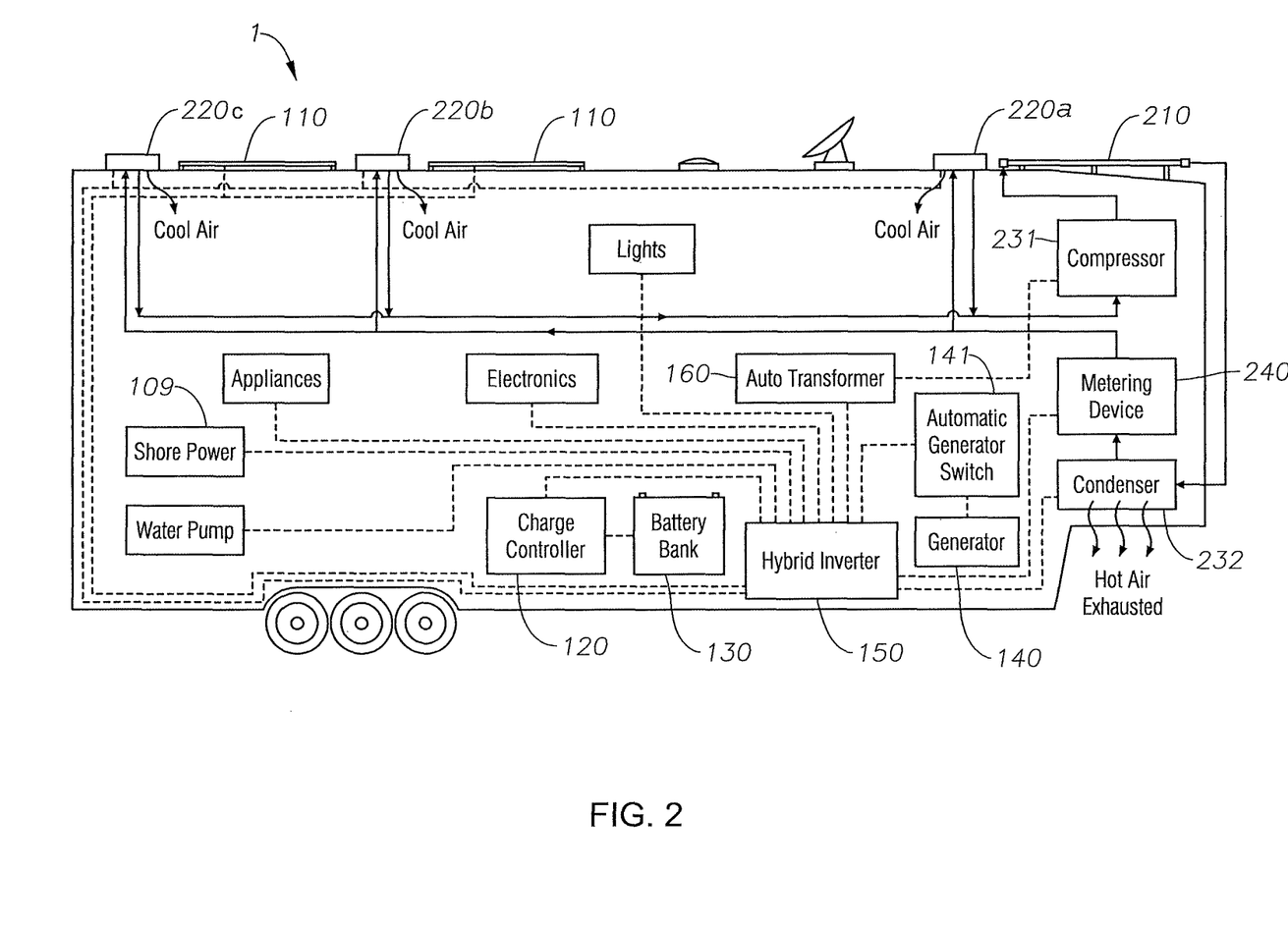
FIG. 2 is another diagram showing the interconnectivity of the solar-thermal air conditioning system, clean energy system, and various electronic components for use in a solar-thermal powered recreational vehicle embodying principles of the present invention.

Referring to FIGS. 1-2, the solar-thermal powered recreational vehicle can comprise a clean energy system 100 for providing electrical power to the recreational vehicle 1. The recreational vehicle 1 has an enclosure having a front wall, a rear wall, a roof, a floor, and two opposing side walls. The clean energy system 100 can feature one or more solar photovoltaic panels 110 mounted to the roof of the recreational vehicle and operatively coupled to a hybrid inverter 150. The clean energy system can also feature both a battery bank 130 and a generator 140. In instances where excess solar energy is collected by the solar photovoltaic panels 110, the excess electrical power will be routed by a charge controller 120 to the battery bank 130 for storage. The stored energy in the battery bank 130 can routed by the hybrid inventor 150 to the recreational vehicle to supplement or replace the solar power if the solar energy collected by the solar photovoltaic panels 110 is insufficient to meet the current power load of the recreational vehicle. Likewise, if the solar panels 110 and battery bank 130 are unable to meet the power load of the recreational vehicle, a generator switch 141 will automatically activate and engage the generator 140. Power from the generator 140 will then be routed by the hybrid inventor 150 to the recreational vehicle to meet its power needs. Lastly, should shore power 109 be available, power will be routed through by the hybrid inventor 150 to the recreational vehicle 1. Thus, power can be supplied by the hybrid inverter 150 from four different energy sources: shore power 109, the solar photovoltaic panels 110, the battery bank 130, or the generator 140. Regardless of the power source, the hybrid inventor 150 will distribute 110 volt electricity to the recreational vehicle 1 to meet its power needs, such as appliances, lights, electronics, and the solar-thermal air conditioning system discussed below.

Still referring to FIGS. 1-2, the solar-thermal powered recreational vehicle 1 also features a solar-thermal air conditioning system powered by the clean energy system. The solar-thermal air conditioning system includes a compressor 231, a solar collector 210, a condenser 232, a metering device 240, and an evaporator 220. 110 volt power can be distributed directly to the condenser 232, evaporator 220, and metering device 240 (if required) by the hybrid inverter 150. However, in order to power the HVAC compressor, an auto transformer 160 (i.e., a 110-220 up/down voltage converter) is utilized in order to up-convert power leaving the hybrid invertor 150 from 110 volts to 220 volts.

In operation, refrigerant/working fluid can be routed sequentially through the compressor 231, the solar-thermal collector panel 210, the condenser 232, the metering device 240, the evaporator 220, and then back to the compressor 231. The compressor 231 mechanically compresses the refrigerant, the solar collector 210 superheats the compressed refrigerant using radiant energy from the sun, the condenser 232 condenses the heated refrigerant, and the evaporator 220 evaporates the condensed refrigerant. By superheating the refrigerant with the aid of the solar collector 210, the temperature difference between the condenser coil and the ambient air temperature can be increased using free energy (i.e., the solar energy captured by the solar collector). By creating this difference, the air flowing through the condenser 232 will be very cold relative to the temperature of the discharge vapor, allowing the heat energy in the vapor to move into that relatively cold air and cause the refrigerant to condense. Meanwhile, because the load of heating the refrigerant is shared between the solar compressor and the solar collector, the work done by the compressor 231 can be reduced, thereby reducing the power consumption of the compressor 231.

The solar photovoltaic (PV) panels 110 can be mounted to the top or roof of the recreational vehicle 1 with standard brackets to supply usable solar power. Preferably, the PV panels 110 are mounted in pairs to allow for the panels to be wired in either parallel configuration or series configuration. In a preferred embodiment, modern six to eight standard 250 watt panels can be mounted to the top of the recreational vehicle 1 and wired in parallel to provide a solar panel array capable of producing approximately 3 kilowatt-hours (kWh).

The hybrid inverter 150 functions to change the electrical current supplied by the PV array from DC current to AC current. The hybrid inverter 150 preferably is a pure sine wave inverter in modular form. The hybrid inverter 150 can be integrated into a pre-wired panel system capable of receiving power from multiple sources (e.g., a PV array, battery bank, generator, and/or shore power) and distributing it to multiple AC loads. In addition to the hybrid inverter/charger 150, the integrated panel system preferably comprises AC and DC wiring boxes; a surge protector; a system display and controller; a system communications manager that communicates stacking, load share and power save on/off signals; battery and PV array breakers, a PV GFDI breaker, an input-output-bypass assembly; and additional AC breakers. Commercially available integrated inverter/charger panel systems suitable for use with the present invention include the FLEXpower™ ONE system manufactured by Outback Power, Inc. and the Conext XW™ system manufactured by Schneider Electric SE.

The battery bank 130 stores excess solar energy collected by the solar PV panels 110. The battery bank 130 preferably comprises batteries having a large capacity and small footprint. In an embodiment suitable for the present invention, the battery bank 130 be comprises four to six marine batteries. The batteries can be wired in parallel or in series. In a preferred embodiment, the batteries of the battery bank 130 are wired in series to double the voltage from 12 volts to 24 volts.

The charge controller 120 functions to optimize the PV array's output which can fluctuate based on shading and temperature variables, as well as regulate discharge from the battery bank 130. The charge controller 120 can be a stand-alone component, or it may be a module of the integrated inverter/charger panel system. The charge controller settings may be modified to optimize battery life, maximize clean energy operation, or to balance battery life with clean energy operation. In a preferred embodiment, the charge controller is set to limit discharge to 40% of battery capacity.

The generator 140 functions as a back-up power source when the solar panels 110 and the battery bank 130 are unable to meet the power load of the recreational vehicle 1 and shore power is unavailable. The generator 140 preferably is a 6.5 kW to 8 kW diesel generator prewired for both 110 voltage and 220 voltage. The generator switch 141 will automatically activate or stop the generator 140 in response to changing power requirements. For example, when output power demands exceed the power available from the solar panels 110 and the battery bank 130, power from the generator 140 will be routed by the hybrid inventor 150 to the recreational vehicle to meet its power needs.

The solar-thermal air conditioning system of the present invention features a solar collector 210 combined with a direct expansion air conditioning (DX) system (e.g., a compressor 231, a condenser 232, a metering device 240, and an evaporator 220). The solar-thermal air conditioning system preferably is a mini-split (ductless) heat pump system, such as the SolarCool™ solar-thermal HVAC system manufactured by Sedna Aire USA and described in U.S. Pat. No. 8,448,458, which is incorporated by reference herein. The solar-thermal air conditioning system comprises a roof-mounted, 20-tube solar collector 210, an outdoor condenser unit 230 which contains a multi-stage compressor 231 and condenser 232, and one or more indoor ceiling cassettes which each contain the evaporator coil 220 and a fan. The solar collector 210 and DX system components are interconnected by refrigerant lines to provide a closed refrigerant loop through which the working fluid can be transmitted.

Figure 3:
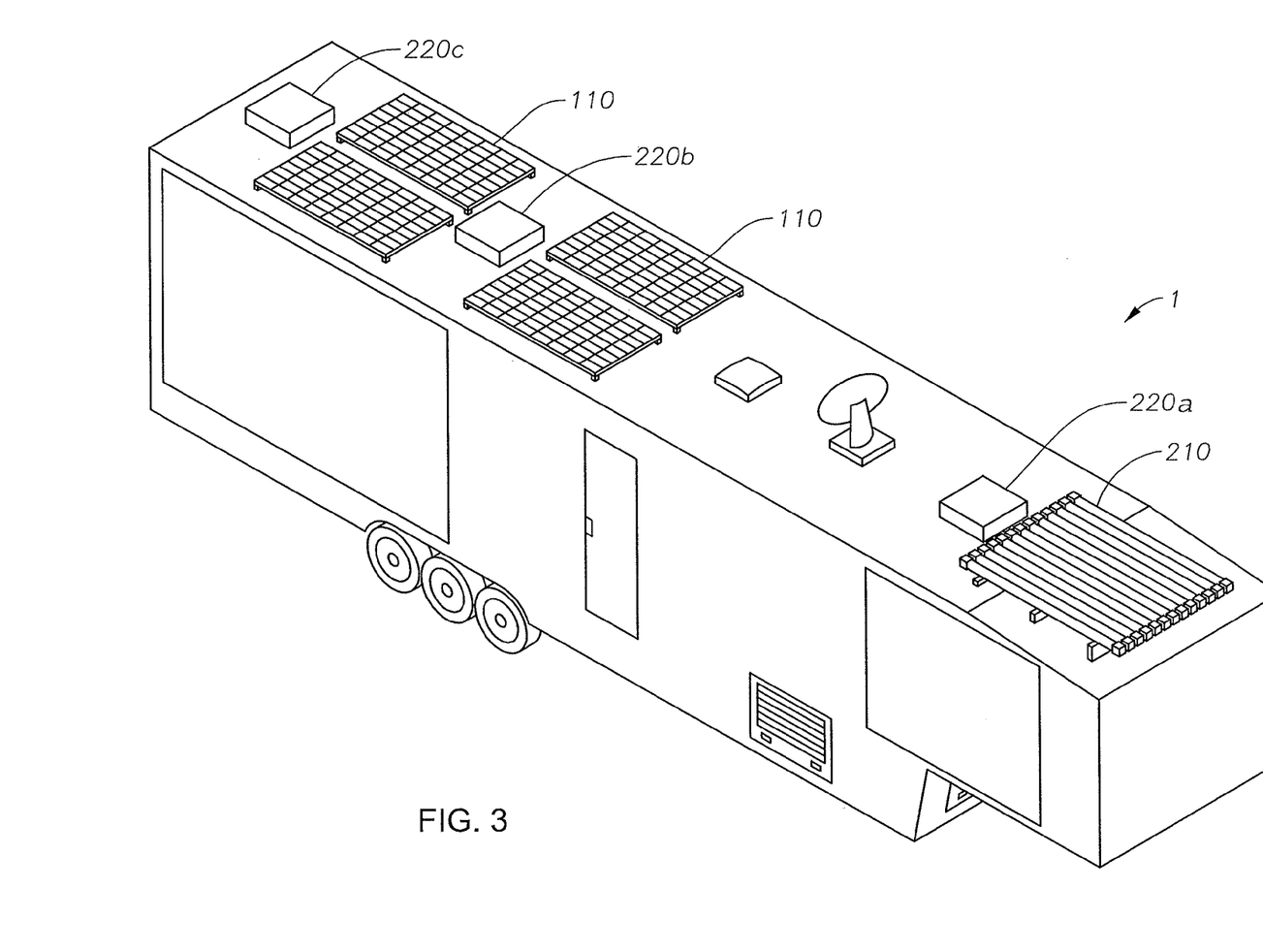
FIG. 3 is a perspective view of a solar-thermal powered recreational vehicle embodying principles of the present invention.
Figure 4:
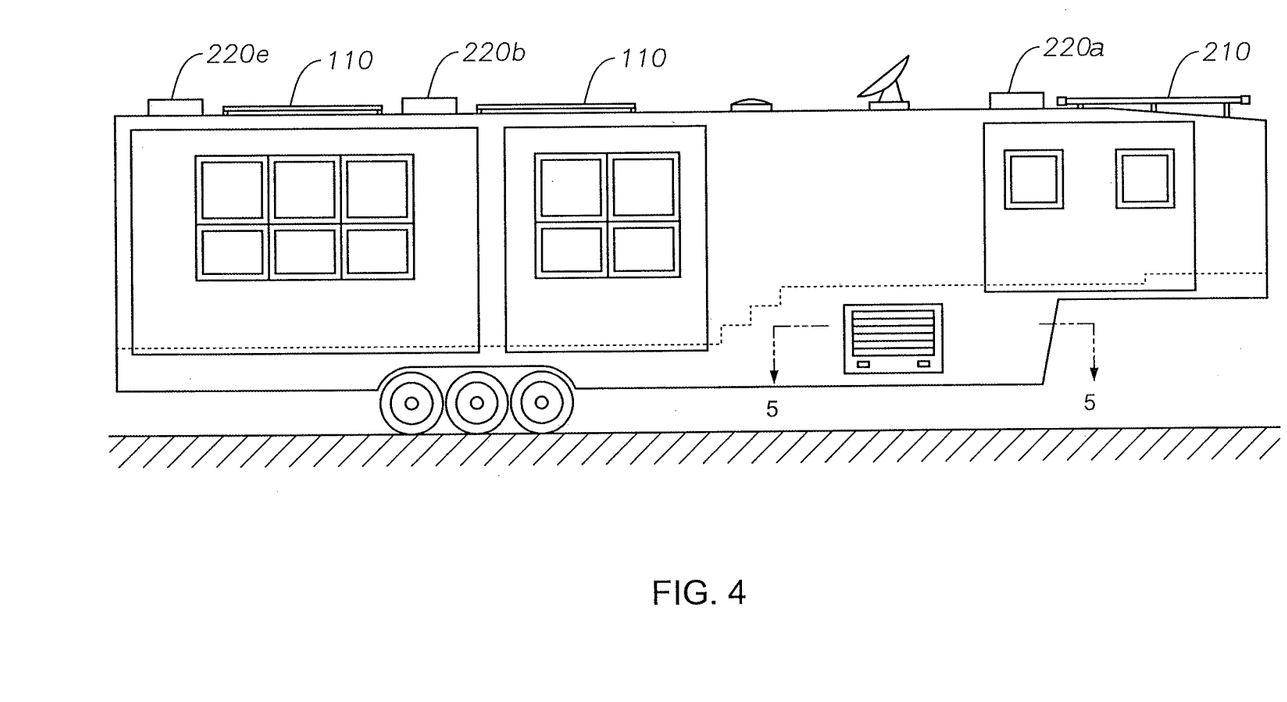
FIG. 4 is a side view of the of a solar-thermal powered recreational vehicle depicted in FIG. 3.
Figure 5:
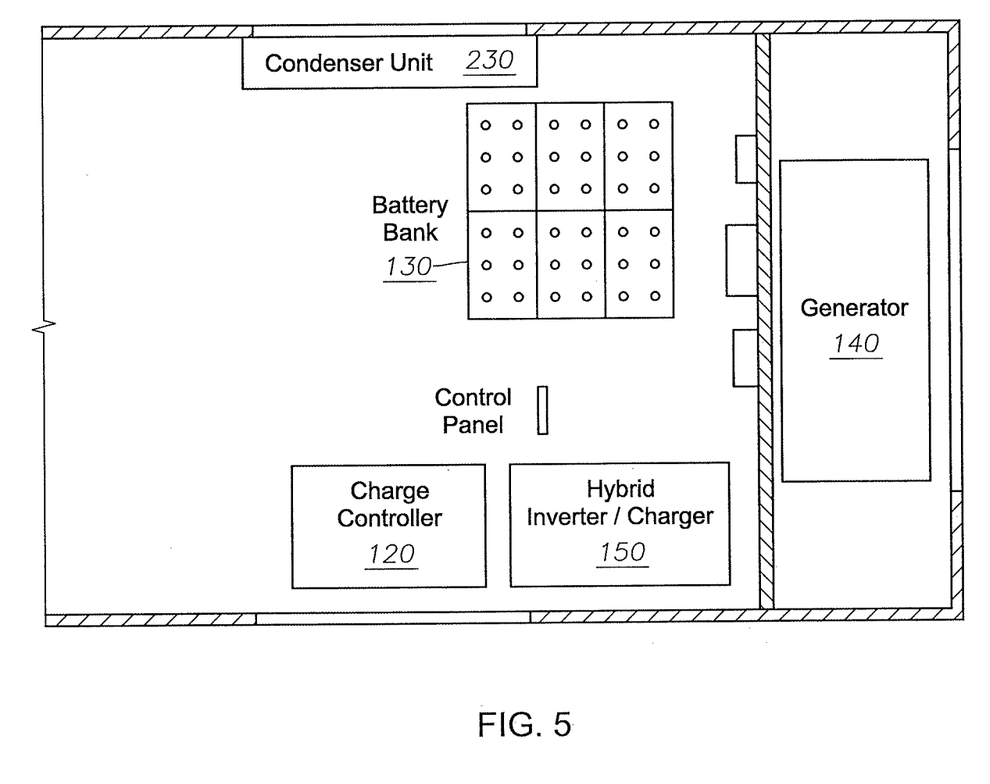
FIG. 5 is a detailed section view of the storage area identified in FIG. 4, showing several of the internal components of the solar-thermal powered recreational vehicle depicted in FIGS. 3 and 4.

Referring now to FIGS. 3-5, a 5$^{th}$ wheel recreational vehicle embodying the principles of the present invention is shown. The recreational vehicle 1 comprises an enclosure having a floor, a roof, and walls. Mounted to the roof of the recreational vehicle 1 are four solar PV panels 110, a 20-tube solar collector 210, and ceiling cassettes 220a, 220b, 220c each containing an evaporator coil 220 and a fan. Located beneath the living quarters of the recreational vehicle 1 is the inverter/charger 150, charge controller 120, battery bank 130, generator 140, condenser unit 230 (compressor 231 and condenser coil 232), and the auto transformer 160 (not shown).

Figure 6:
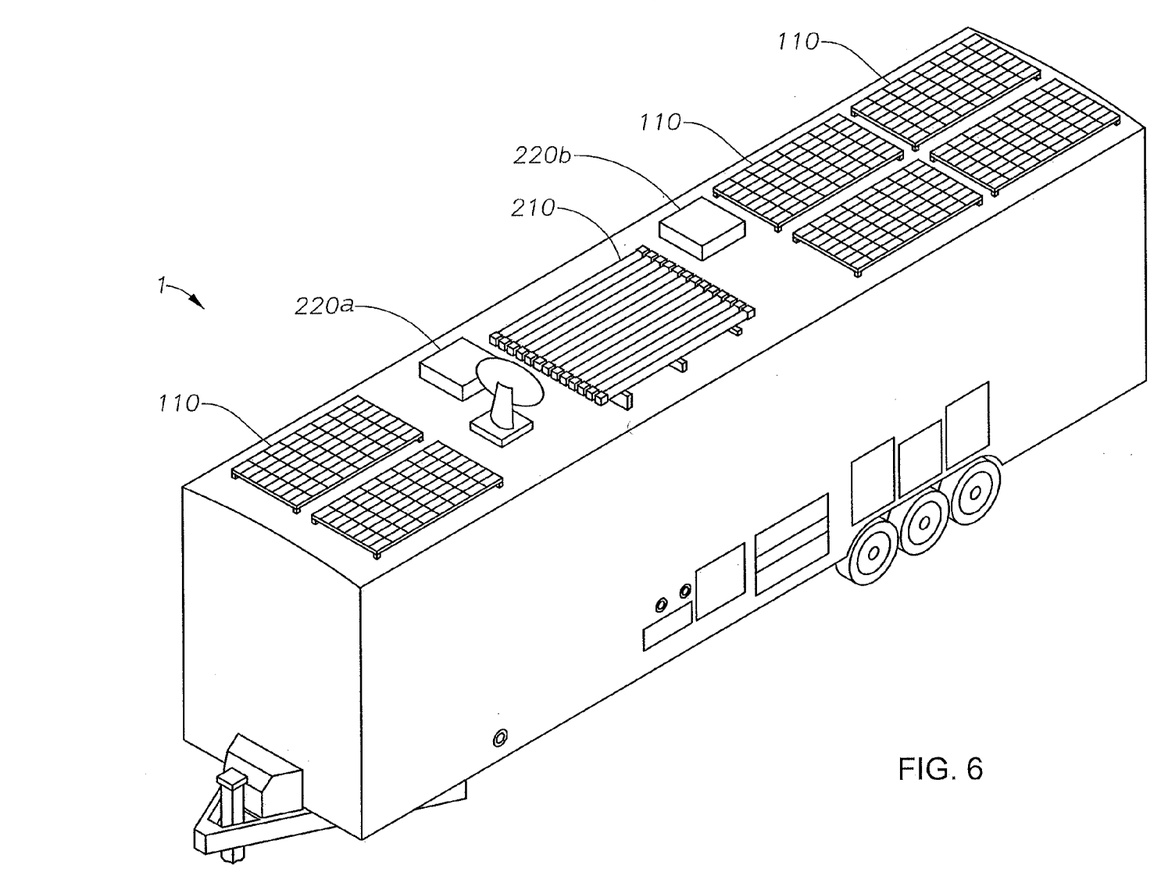
FIG. 6 is a perspective view of another embodiment of a solar-thermal powered recreational vehicle embodying principles of the present invention.
Figure 7:
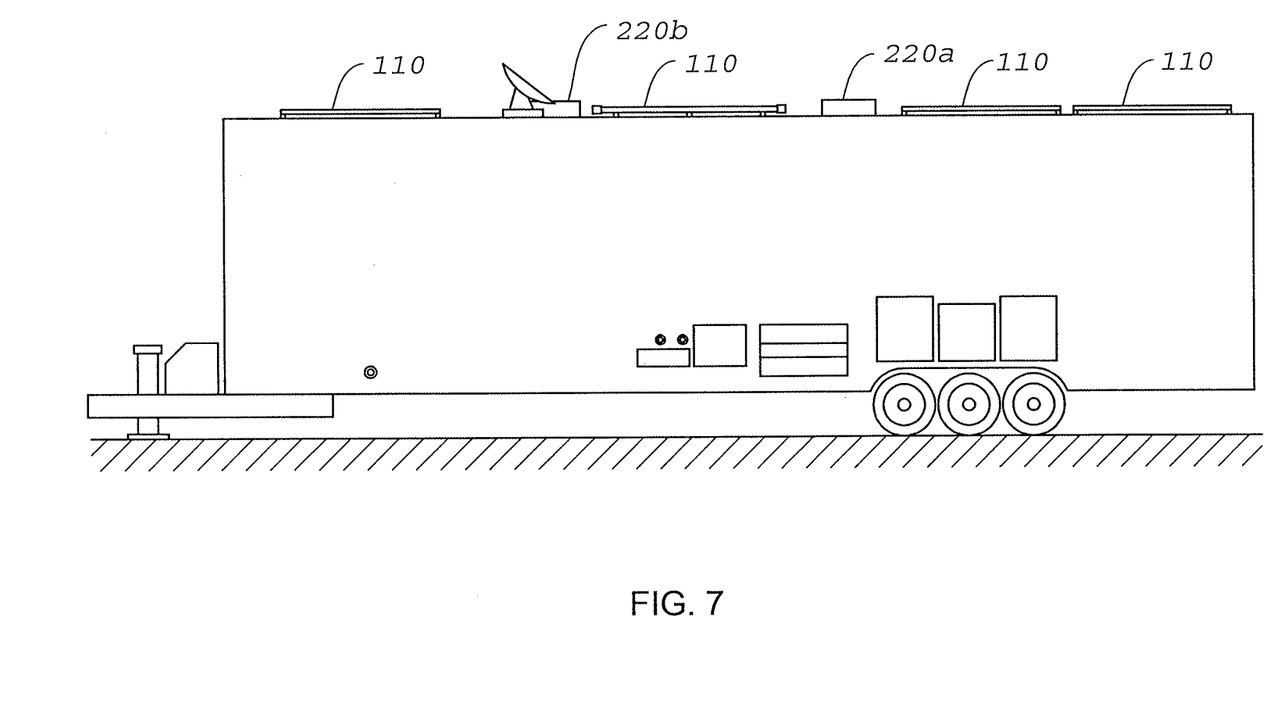
FIG. 7 is a side view of the of a solar-thermal powered recreational vehicle depicted in FIG. 6.
Figure 8:
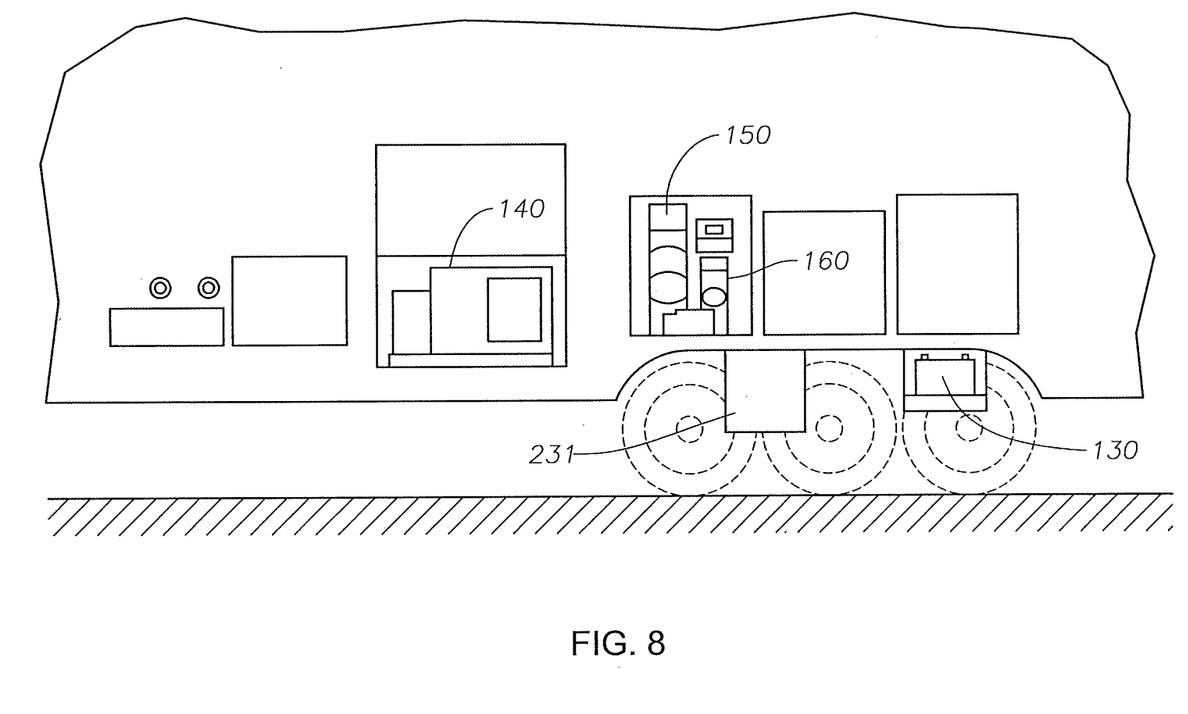
FIG. 8 is a detailed view of the storage area of the of a solar-thermal powered recreational vehicle depicted in FIG. 6 showing several of the internal components.

Referring now to FIGS. 6-8, a conventional towable recreational vehicle embodying the principles of the present invention is shown. The recreational vehicle 1 comprises an enclosure having a floor, a roof, and walls. Mounted to the roof of the recreational vehicle 1 are six solar PV panels 110, a 20-tube solar collector 210, and ceiling cassettes 220a, 220b each containing an evaporator coil 220 and a fan. As depicted in FIG. 8, the generator 140, inverter/charger 150, and auto transformer 160 are located in side storage compartments of the recreational vehicle. The condenser unit 230 and the battery bank 130 are suspended beneath the trailer on trays proximate to the axle housings of the trailer.

Figure 9:
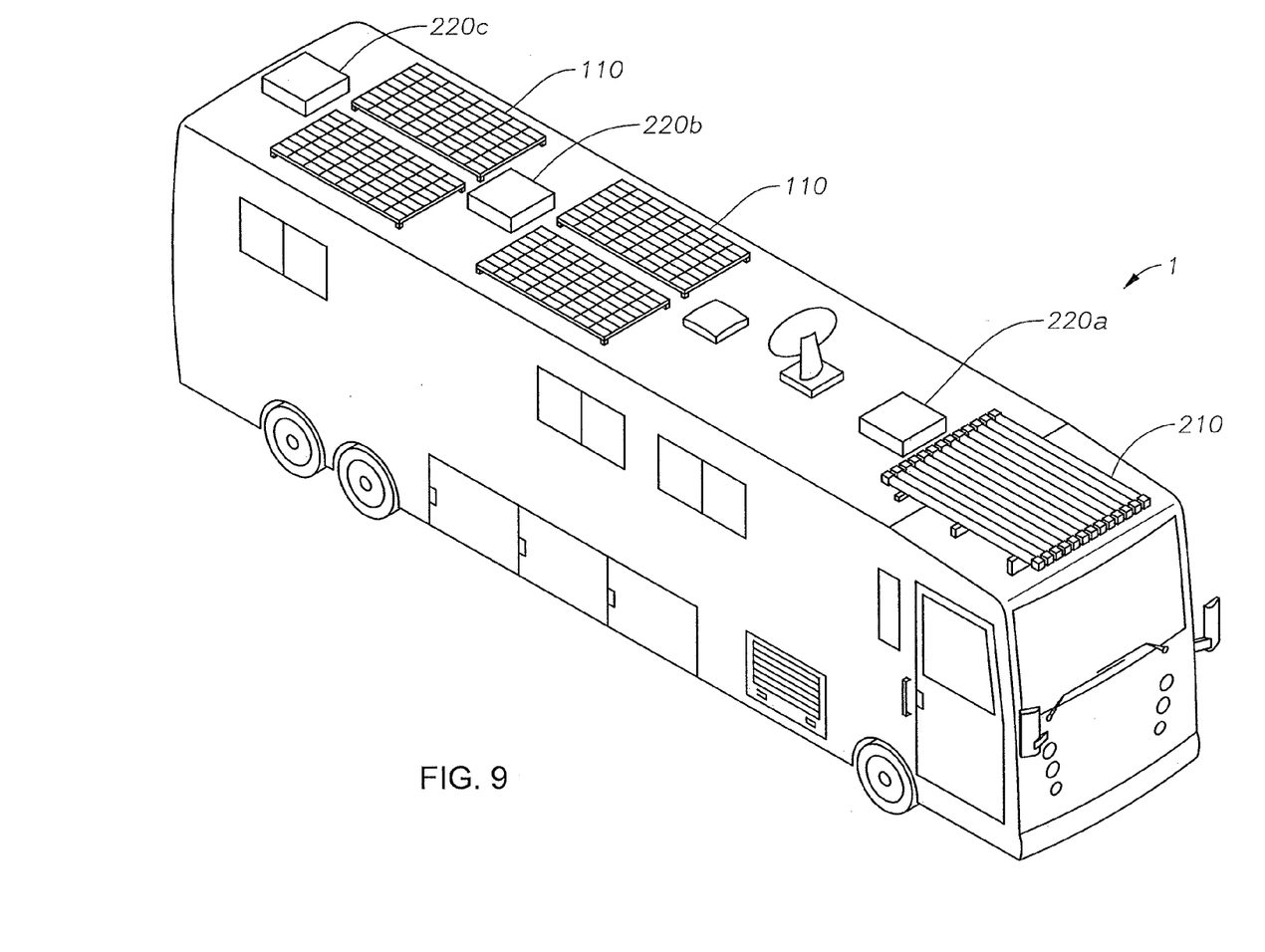
FIG. 9 is a perspective view of another embodiment of a solar-thermal powered recreational vehicle embodying principles of the present invention.

Referring now to FIG. 9, a Class A motorhome embodying the principles of the present invention is shown. The recreational vehicle 1 comprises an enclosure having a floor, a roof, and walls. Mounted to the roof of the recreational vehicle 1 are four solar PV panels 110, a 20-tube solar collector 210, and ceiling cassettes 220a, 220b, 220c each containing an evaporator coil 220 and a fan. As with the 5$^{th}$ wheel trailer depicted in FIGS. 3-5, the inverter/charger 150, charge controller 120, battery bank 130, generator 140, condenser unit 230 (compressor 231 and condenser coil 232), and the auto transformer 160 (not shown) are located beneath the living quarters of the recreational vehicle 1.

Many modifications and other embodiments of the invention set forth herein will come to mind to one skilled in the art having the benefit of the teaching presented in the foregoing description and associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A solar-thermal powered recreational vehicle comprising:
   a. an enclosure having a floor, a roof, and walls;
   b. a clean energy system for providing electrical power to the recreational vehicle, the clean energy system comprising:
      i. one or more solar photovoltaic panels mounted to the roof of the enclosure;
      ii. an inverter adapted to supply electrical power to the recreational vehicle, the inverter operatively connected to the one or more solar panels;
      iii. a battery bank operatively connected to the inverter for storing energy collected via the solar panels;
   c. a solar-thermal air conditioning system powered by the clean energy system, the solar-thermal air conditioning system comprising:
      i. a compressor;
      ii. a condenser;
      iii. a solar-thermal collector panel operatively connected to the compressor and condenser, wherein the solar-thermal collector panel heats the compressed refrigerant prior to said compressed refrigerant being transmitted to the condenser; and iv. an air handling unit mounted to the enclosure for providing conditioned air to the enclosure, the air handling unit comprising an evaporator coil and a fan, wherein the evaporator coil is operatively connected to the condenser.

2. The solar-thermal powered recreational vehicle of claim 1, wherein the clean energy system further comprises a charge controller, the charge controller operatively linking the inverter to the battery bank.

3. The solar-thermal powered recreational vehicle of claim 2, wherein the clean energy system further comprises a generator operatively connected to the inverter to provide backup power.

4. The solar-thermal powered recreational vehicle of claim 3, wherein the clean energy system further comprises a generator switch operatively linking the inverter to the generator.

5. The solar-thermal powered recreational vehicle of claim 4, wherein the clean energy system further comprises an auto transformer, the auto transformer operatively linking the inverter to the compressor in order to up-convert power leaving the inverter from 110 volts to 220 volts.

6. A solar-thermal powered recreational vehicle comprising:
   a. an enclosure having a floor, a roof, and walls;
   b. a clean energy system for providing electrical power to the recreational vehicle, the clean energy system comprising:
      i. one or more solar photovoltaic panels mounted to the roof of the enclosure;
      ii. an inverter adapted to supply electrical power to the recreational vehicle, the inverter operatively connected to the one or more solar panels;
      iii. a battery bank operatively connected to the inverter for storing energy collected via the solar panels;
      iv. an auto transformer operatively connected to the inverter,
      v. a generator operatively connected to the inverter to provide backup power;
   c. a solar-thermal air conditioning system powered by the clean energy system, the solar-thermal air conditioning system comprising:
      i. a compressor operatively connected to the auto transformer to allow power supplied by the inverter to the compressor to be up-converted from 110 volts to 220 volts;
      ii. a condenser;
      iii. a solar-thermal collector panel operatively connected to the compressor and condenser, wherein the solar-thermal collector panel heats the compressed refrigerant prior to said compressed refrigerant being transmitted to the condenser; and
      iv. an air handling unit mounted to the enclosure for providing conditioned air to the enclosure, the air handling unit comprising an evaporator coil and a fan, wherein the evaporator coil is operatively connected to the condenser.

7. The solar-thermal powered recreational vehicle of claim 6, wherein the clean energy system further comprises a charge controller, the charge controller operatively linking the inverter to the battery bank.

8. The solar-thermal powered recreational vehicle of claim 6, wherein the clean energy system further comprises a generator switch operatively linking the inverter to the generator.

9. A solar-thermal powered recreational vehicle comprising:
   a. an enclosure having a floor, a roof, and walls;
   b. a clean energy system for providing electrical power to the recreational vehicle, the clean energy system comprising:
      i. one or more solar photovoltaic panels mounted to the roof of the enclosure;
      ii. an inverter adapted to supply electrical power to the recreational vehicle, the inverter operatively connected to the one or more solar panels;
      iii. a battery bank operatively connected to the inverter for storing energy collected via the solar panels;
      iv. an auto transformer operatively connected to the inverter;
   c. a solar-thermal air conditioning system powered by the clean energy system, the solar-thermal air conditioning system comprising:
      i. a compressor operatively connected to the auto transformer to allow power supplied by the inverter to the compressor to be up-converted from 110 volts to 220 volts;
      ii. a condenser;
      iii. a solar-thermal collector panel operatively connected to the compressor and condenser, wherein the solar-thermal collector panel heats the compressed refrigerant prior to said compressed refrigerant being transmitted to the condenser, and
      iv. an air handling unit mounted to the enclosure for providing conditioned air to the enclosure, the air handling unit comprising an evaporator coil and a fan, wherein the evaporator coil is operatively connected to the condenser.

10. The solar-thermal powered recreational vehicle of claim 9, wherein the clean energy system further comprises a charge controller, the charge controller operatively linking the inverter to the battery bank.

11. The solar-thermal powered recreational vehicle of claim 10, wherein the clean energy system further comprises a generator operatively connected to the inverter to provide backup power.

* * * * *

UNITED STATES PATENT AND TRADEMARK OFFICE
CERTIFICATE OF CORRECTION

PATENT NO. : 9,505,307 B2  
APPLICATION NO. : 14/737339  
DATED : November 29, 2016  
INVENTOR(S) : Champagne et al.

Page 1 of 1

It is certified that error appears in the above-identified patent and that said Letters Patent is hereby corrected as shown below:

On the Title Page

Item (72) Inventor is corrected to read:
-- Andre Champagne, New Orleans, LA;
Roger Timoteo, Harahan, LA;
Sean Bernard, New Orleans, LA;
Wiliomar Oliveira, Metairie, LA --.

Signed and Sealed this
Twenty-fourth Day of September, 2019

Andrei Iancu
*Director of the United States Patent and Trademark Office*